United States Patent [19]

Brady et al.

[11] 4,415,879
[45] Nov. 15, 1983

[54] AIRCRAFT FLIGHT INSTRUMENT DISPLAY SYSTEM

[75] Inventors: Robert H. Brady, Houston; Michael L. Beaumont, Deer Park; Arthur C. Pettis, Houston, all of Tex.

[73] Assignee: Aviation Instrument Manufacturing Corporation, Austin, Tex.

[21] Appl. No.: 239,422

[22] Filed: Mar. 2, 1981

[51] Int. Cl.³ .................. G08G 5/00; B64D 45/04
[52] U.S. Cl. .................. 340/27 NA; 73/178 R
[58] Field of Search ......... 340/27 R, 27 AT, 27 NA, 340/720, 721; 33/328-330; 73/178 R, 178 T; 35/12 F, 12 N, 12 L; 116/DIG. 43; 343/107, 108 R; 364/424, 443, 434, 433; 244/181; 358/103

[56] References Cited

U.S. PATENT DOCUMENTS

| | | | |
|---|---|---|---|
| 3,521,227 | 7/1970 | Congleton et al. | 340/27 NA |
| 3,557,120 | 5/1971 | Sherbert, Jr. | 343/108 R |
| 3,648,230 | 3/1972 | Younkin | 340/27 NA |
| 3,668,622 | 6/1972 | Gannett et al. | 340/27 NA |
| 3,668,623 | 6/1972 | Csaposs | 340/27 NA |
| 3,784,969 | 1/1974 | Wilckens et al. | 340/27 NA |
| 3,806,865 | 4/1974 | Stephan et al. | 340/27 NA |
| 4,040,005 | 8/1977 | Melvin | 340/27 NA |
| 4,149,148 | 4/1979 | Miller et al. | 340/720 |
| 4,283,705 | 8/1981 | James et al. | 340/27 NA |

*Primary Examiner*—Thomas A. Robinson
*Attorney, Agent, or Firm*—Kenneth H. Johnson

[57] ABSTRACT

A combination directional gyro and navigation radio indicator instrument for use in aircraft which provides a display of compass card, selected course pointer, course deviation indicator, to-from indicator, and glide slope indicator in a unique presentation. The compass card is directly driven by the directional gyro, and the selected course pointer normally rotates with the compass card when it rotates, but can be de-clutched for selection of a new course. The selected course signal is obtained by attenuating, amplifying, and phase shifting the reference signal from a navigation radio such that it can be sent to the rotor of a control transformer which is geared to the compass card. The resulting stator signal is then amplified and sent to the rotor of a differential resolver which is geared to the course selector pointer. The control transformer and the differential transformer rotors turn in opposite directions such that the reference signal does not change when the compass card and the course selector pointer move together, but does change when the course selector is de-clutched and moves independently of the compass card. The resulting signal from the stator of the differential transformer is therefore an electrical representation of the selected course. This signal is then sent back to the navigation radio where it is compared to the signal representing the actual course of the aircraft that is received from a stationary navigation radio transmitter (VORTAC).

22 Claims, 7 Drawing Figures

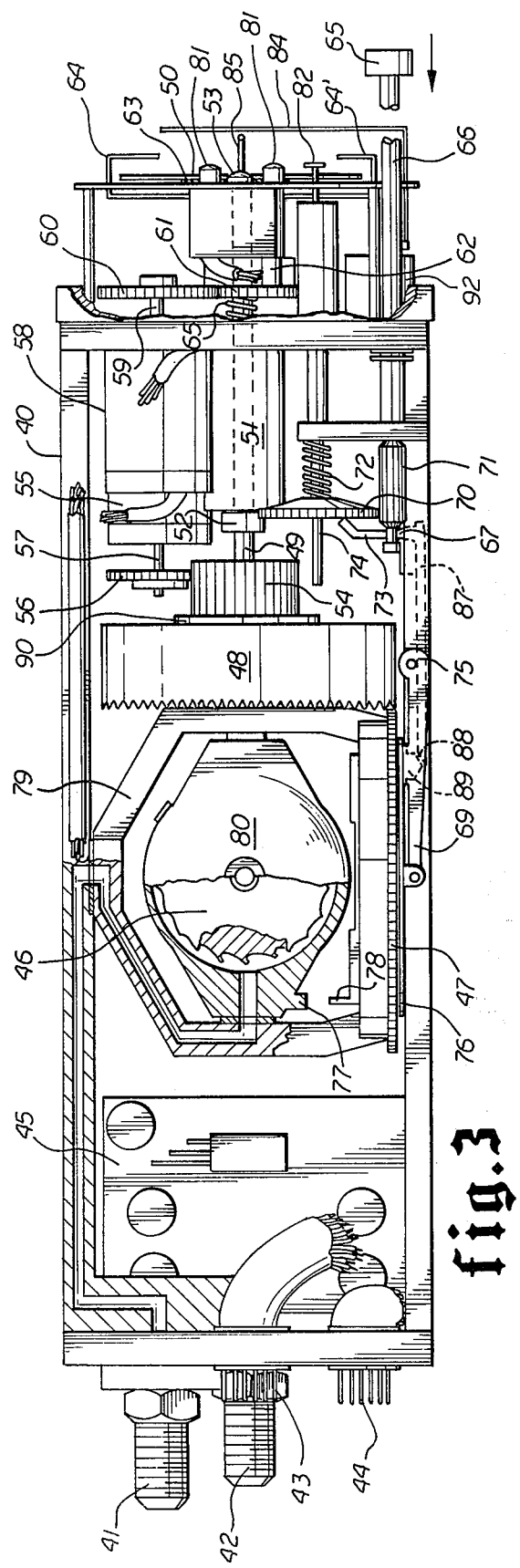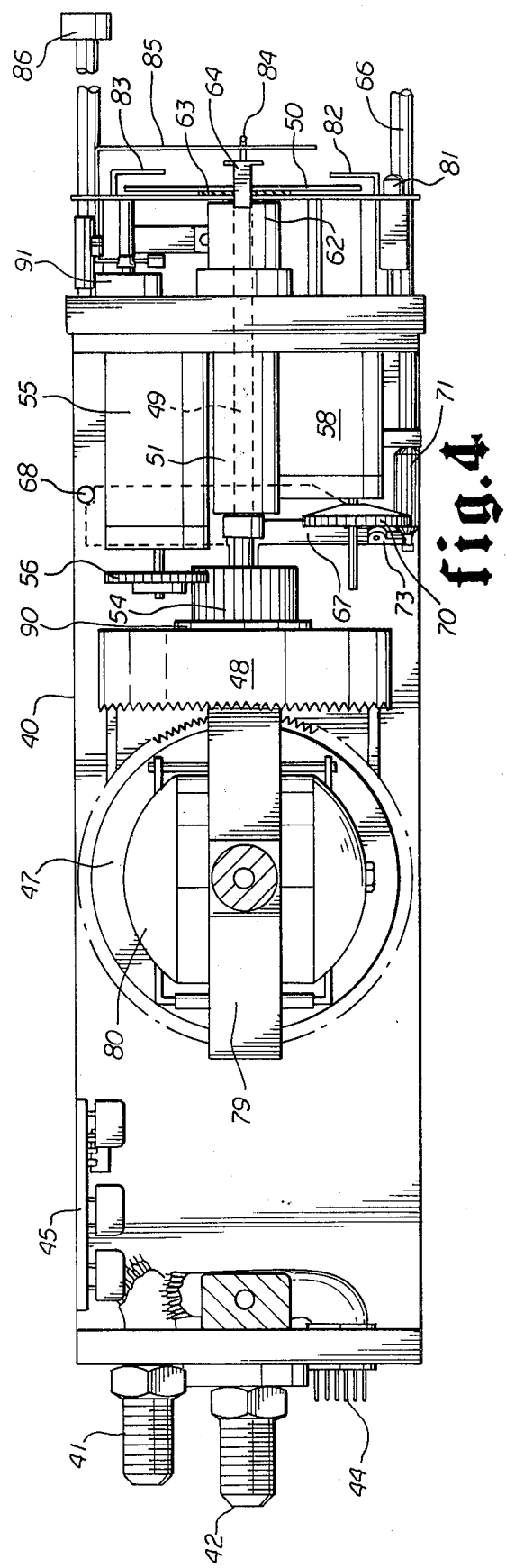

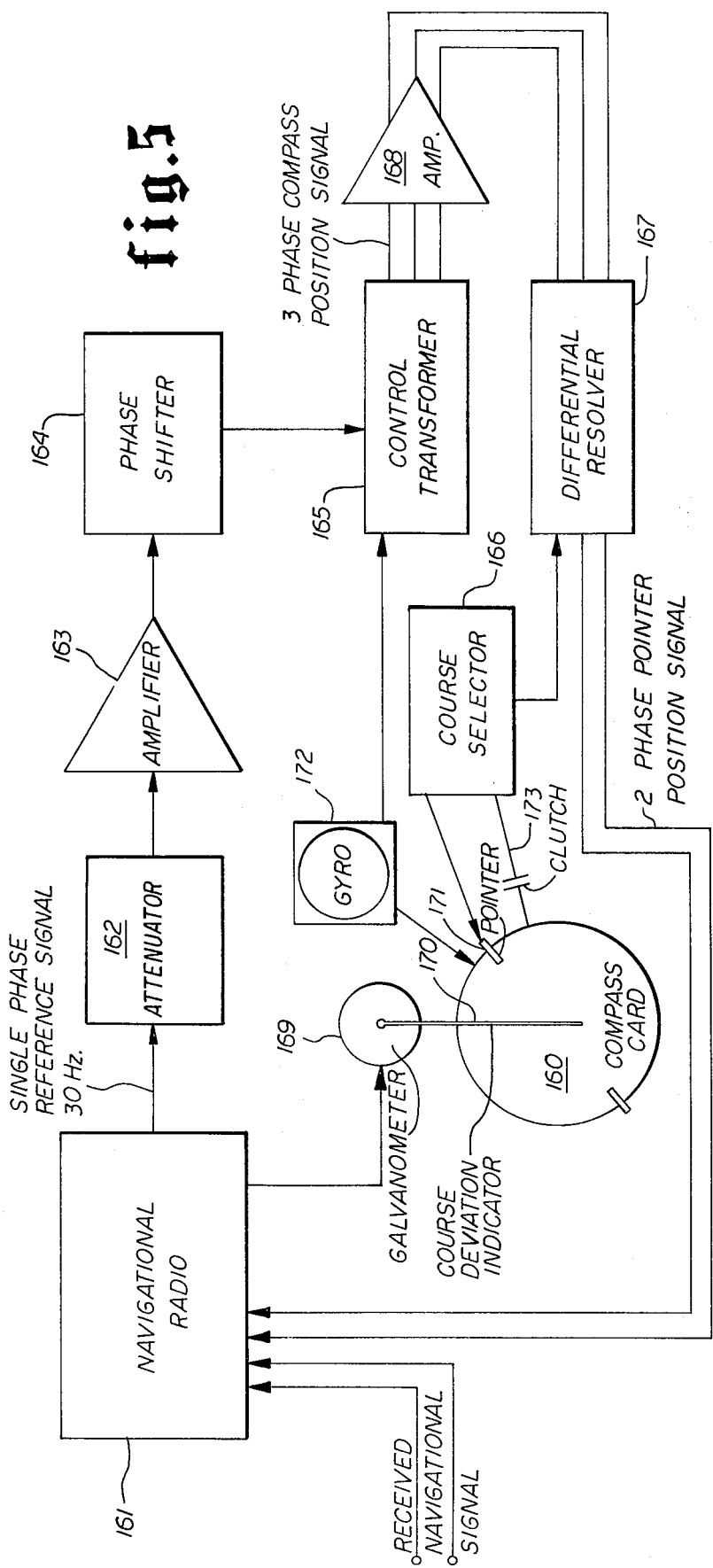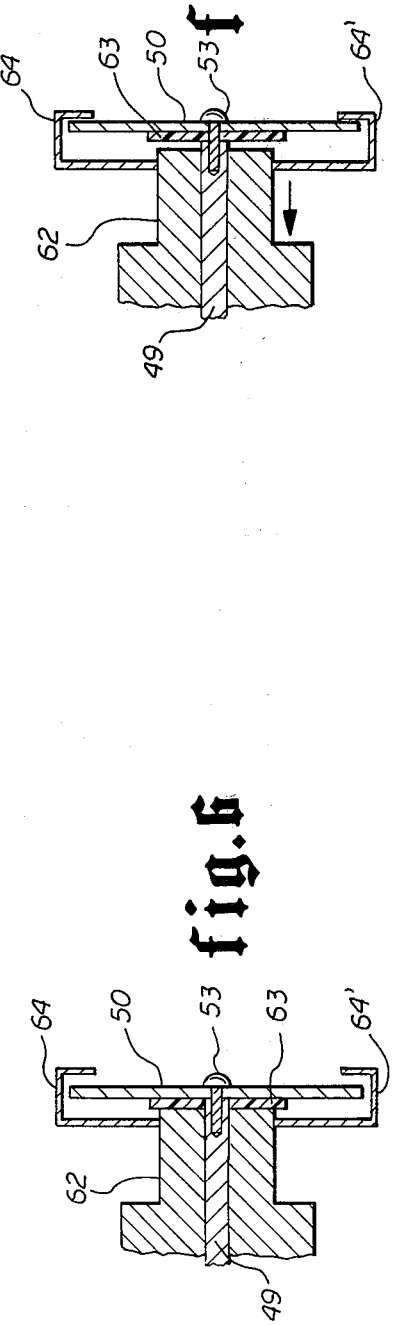

AIRCRAFT FLIGHT INSTRUMENT DISPLAY SYSTEM

BACKGROUND OF THE INVENTION

1. Field of the Invention

The present invention relates to a device which combines the functions of a directional gyro (DG) and navigation radio indicator in a single instrument for aircraft.

2. Description of the Related Art

The conventional method of presenting heading and course information on an aircraft panel is by using two instruments; a directional gyro (DG) for heading, and a navigation radio indicator for course. The DG has a rotating dial (360°) display with the present heading appearing at the top of the instrument as the airplane moves in azimuth. The navigation radio indicator has an omni bearing selector (OBS) dial (360°) which can be rotated manually to select a particular navigation radio course. It has a course deviation indicator that moves in relation to the aircraft's position with respect to the selected navigation radio course, and a To-From indicator to eliminate reciprocal ambiguity. These two instruments are simple and reliable, and they provide all of the heading and course information necessary for normal aircraft navigation. This two instrument display was used by practically all aircraft for many years and is still used today by most small single engine aircraft. Also included in some navigation radio indicators is a glide slope indicator which moves in relation to the aircraft's position relative to the glide slope beam of an instrument landing system (ILS).

Although the two instrument system described above provides all necessary heading and course information, interpreting the relationship between heading and course can be a complex mental integration exercise. In order to simplify this integration problem, the horizontal situation indicator (HSI) was developed. This is a single instrument that combines the DG and navigation radio indicator functions in one display. This was an excellent solution to the problem, and HSI's are found on most large aircraft today. The HSI is very expensive, however, and is financially out of reach for most small single engine aircraft owners. Some years ago, the directional gyro-omni (DGO) was developed which was a low cost version of the HSI. The DGO (U.S. Pat. No. 3,806,865) was not commercially successful because of poor reliability caused by extreme mechanical complexity and the undesirable feature that a new course could not be selected unless the aircraft was in straight and level flight. It was taken out of production after about five years. At present, there are no combined display instruments available at a cost that allows usage on small single engine aircraft.

The problems or disadvantages which the piror DGO had which finally led to its commercial demise were:

1. It was necessary to cage the gyro in order to select a new course, meaning a new course could only be selected in straight and level flight.

2. It had an eight circuit brush block/slip ring assembly with very low level current passing through it that was subject to intermittent operation because of easy susceptibility to contamination by minute particles.

3. It used a potentiometer for the electrical portion of the OBS function which was also easily susceptible to contamination by minute particles.

4. It used a clutch-brake mechanism for the mechanical portion of the OBS function which was complex and unreliable.

5. It had two meters mounted on a freely rotating dial assembly that were susceptible to "bouncing on the stop" under normal aircraft vibration.

The present invention has as its advantages the elimination of the problems of the prior DGO device while retaining the functions and low cost thereof. The fact that the heading card is driven directly by the DG allows the cost to be maintained within the means of most small aircraft owners. A particular feature of the present invention is a cross pointer display of the course deviation indicator and the glide slope indicator in front of a compass card with course select pointer. Another particular feature of the present invention is the manner in which the selected course can be changed without the need for caging the gyro. An additional feature is the manner in which the selected course information is generated and transmitted to the navigation radio.

These particular features result in an integrated navigation display at a relatively low cost, free of the severe problems associated with the previous DGO.

SUMMARY OF THE INVENTION

Briefly, the present invention provides an aircraft gyro and navigation radio indicator assembly mounted in a single housing, an instrument face for integrated presentation of a compass card, a course selector, course deviation indicator and To-From indicator. In preferred embodiments, a glide slope deviation indicator is provided.

It is a particular advantage of the present apparatus that the course and heading information of the aircraft are provided in a single integrated display which provides the pilot with the relationship between course and heading. The apparatus is relatively simple compared to prior apparatus which provide similar displays. The course selector is disengagable from the compass card by means of a clutch assembly, thereby allowing a new course selection without caging the gyro. This also allows selection of a new course when the plane is in other than straight and level flight. This in itself is a distinction and simplification over prior direct drive instruments.

The adjustment of the compass card to correct for gyro drift is accomplished by caging the gyro. Only the compass card and course selector are rotated, the remainder of the instruments being free of the compass card. The course deviation indicator and the glide slope deviation indicator are mounted independently of the compass card on to the housing.

The apparatus in its preferred form has To-From indicators as well as flags to indicate when the directional navigation (obtained from VORTAC stations) or the glide slope system is operational (as is the practice in the industry, the flags are visible when the signal for the system in question is too weak or the system is not in operation).

The selected course signal is obtained in a novel manner by attenuating, amplifying, and phase shifting the reference signal from a navigation radio such that it can be sent to the rotor of a control transformer which is geared to the compass card. The resulting stator signal is then amplified and sent to the rotor of a differential resolver which is geared to the course selector pointer. The control transformer and the differential transformer rotors turn in opposite directions such that the reference signal does not change when the compass card and the course selector pointer move together, but does change when the course selector is de-clutched and moves independently of the compass card. The resulting signal from the stator of the differential transformer is therefore an electrical representation of the selected course. This signal is then sent back to the navigation radio where it is compared to the signal representing the actual course of the aircraft that is received from a stationary navigation radio transmitter (VORTAC).

The comparison of the selected course with the transmitted navigation course is the means by which the course deviation indicator is driven. The galvanometer which operates the course deviation indicator is mounted in the housing, above or below the compass card with the indicator extending on a vertical line through the central axis of the compass card when the signal for the selected course corresponds to the transmitted navigation course (or the radio navigation system is off). Deviation of the craft from the correct course causes a disparity between the selected signal and the transmitted signal and a deflection of the indicator correspondingly. As is conventional in flying, the course correction is made by flying in the direction toward the deflected indicator until the indicator is again vertical.

The term "heading" as used herein is understood to mean the compass direction of the aircraft. The term "course" as used herein is understood to mean the line of forward progression of the aircraft to or from a VORTAC station.

BRIEF DESCRIPTION OF THE DRAWINGS

FIG. 3 is a partial cross sectional side elevation of the present instrument.

FIG. 4 is a top view of the fully assembled instrument of the present invention.

FIG. 5 is a block diagram of the basic portions of the present instrument.

FIG. 6 is a cross sectional view of an enlarged view of the clutch engaging the compass card and the course selector pointer of the present instrument.

FIG. 7 is the same view as FIG. 6 with the clutch disengaged.

DETAILED DESCRIPTION OF THE INVENTION AND PREFERRED EMBODIMENTS

Figure 1:
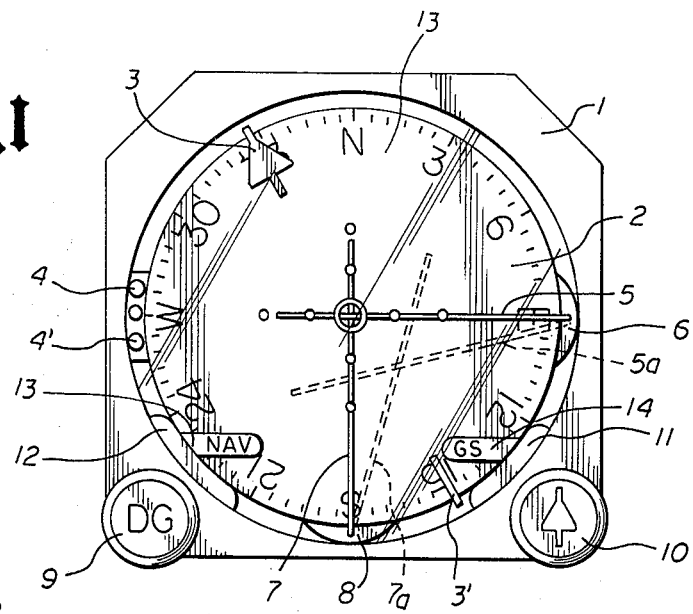
FIG. 1 is a front view of the instrument display of the present invention.

Referring now to the drawings, the various components and functions of the present instrument display system will be described.

FIG. 1 shows the display panel of the present invention and in particular the novel cross member display made by the glide slope deviation indicator 5 and the course deviation indicator 7, both of which are needles which extend laterally over a portion of the compass card 2.

The display panel is located on one end of the instrument and is seated in the instrument case 1. The compass card 2 is the dominant feature of the display panel and central to the operation of the instrument as will be described shortly. The compass card 2 is conventional and is driven by a gyro. As with such instruments there is a drift which must be corrected and for that reason the compass card 2 is disengagable from the gyro (as will be described later) and adjustable by knob 9 (DG-directional gyro). Associated with the compass card 2 is the course selector points 3—3'. Element 3 represents the direction in which the front end of aircraft is pointed and element 3' represents the rear of the aircraft. The pointer 3—3' actually operates off of a central shaft (not shown) behind the compass card and what appears in FIG. 1 is the two ends of the pointer.

The course selection pointer 3—3' is releasably engaged to the compass card such that as the gyro maintains the heading, the course selected remains displayed as a constant. The pointer 3—3' is disengagable from the compass card 2 without caging the gyro by means of course selector knob 10, which allows the selection of any desired course. The course selected is a radio navigation course.

There are two flags, the NAV flag 13 and the GS flag 14. These are conventional and operate as follows. When the navigation radio is off or if on and the signal is too weak, the NAV flag 13 is in view. When the signal is strong enough to be reliable (a predetermined signal level which forms no part of this invention) the flag is down (not visible) behind the shield 12. Similarly, when the radio control glide slope (runway approach) is off or too weak, the GS flag 14 is up and in view, and when the flag 14 is down and out of view behind shield 11 the glide slope radio control is operational. Flag shields 11 and 12 are conveniently printed or painted on the transparent cover 13 over the instrument face.

The transmitted signals (two) for an instrument landing system (ILS) provides both a localizer signal (azimuth) and a glide slope signal, hence the normal navigational signal is not employed and the (ILS) transmission provides both signals. The operation of the course deviation indicator 5 is the same with either transmitted signal.

In FIG. 1 the phantom lines 7a show the course deviation indicator 7 moved to the right indicating the aircraft is off course. The indicator 7 in the vertical position indicates the craft is on the selected radio course. Since as described above, if both the NAV flag 13 and the GS flag 14 were down the (ILS) radio course is operational. Thus indicator 7a indicates the craft is to the left of the course (in this case the runway) and to correct this the pilot flies toward the deflected indicator 7a. When the course is corrected the indicator will be as shown with indicator 7.

The course deviation indicator is moved by a signal sent to galvanometer 8 based on a comparison of the transmitted signal and the selected course of the craft.

The phantom line 5a represents the glide scope (or rate of descent) which places the aircraft too high, hence to correct this the craft is directed by the pilot toward the deflected indicator 5a, i.e., down, until it is in the position of indicator 5. The glide slope indicator 5 is moved by galvanometer 6 after a comparison of the transmitted signal and actual glide path of the craft.

The To-From lights 4 and 4' are respectively conventional and indicate whether the aircraft is flying toward or away from the radio navigational signal. The glide slope indicator is positioned 90° away from the course deviation indicator.

Figure 2:
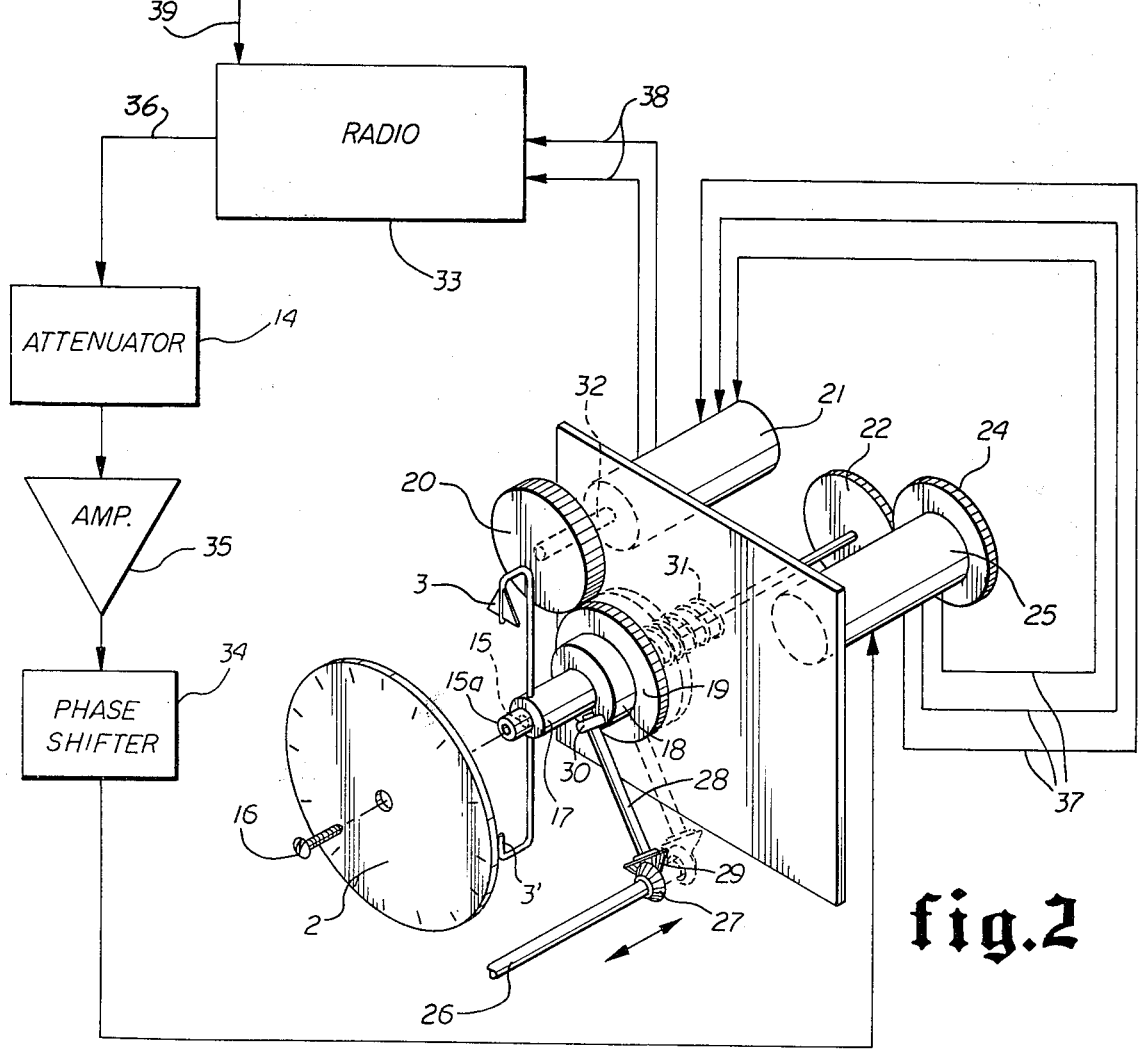
FIG. 2 is an isometric diagrammatic representation of the instrument and circuitry according to the present invention.

Turning now to FIG. 2, the overall interconnection of the course selector, the directional gyro and the radio is illustrated. A single phase reference signal 36 is sent out from radio 33. The signal is attenuated by attenuator 14, amplified by amplifier 35 and a phase shift is carried out in phase shifter 34. The signal is then transmitted to control transformer 25. The control transformer sends out a three phase signal to the differential resolver 21. The differential resolver is 180° out of phase with the control transformer. The significance of this is that both transformers are geared to the directional gyro (not shown) and rotate in different directions, hence a change in the azimuth of the craft does not change the two phase signal 38 from the differential resolver back to the radio for comparison with the received navigation signal, that is, the signal corresponding to the selected course remains constant because the two opposite rotating components cancel out any change in the signal back to the radio resulting from movement of the compass card 2 by the gyro.

The compass card 2 is connected to the gyro through shaft 15 which also connects to gear 22. Gear 22 drives gear 24 which in turn rotates the rotor (not shown) of control transformer 25 and changes the emitted signal. As shown in FIG. 2, gear 20 is engaged with gear 19 and when the elements comprised of gear 19 and sleeve 17 (also the shoulder 18) are biased forward by spring 31 against the inside surface of compass card 2, which is attached to the gyro, the differential resolver 21 is then connected via shaft 32, gears 20, 19 and sleeve 17 to the gyro and its rotor (not shown) will rotate in the opposite direction (by appropriate gearing) at the same rate as control transformer 25.

To change the selected radio course, the rod 26 is depressed toward the body of the instrument. Depressing rod 26 forces shaft 28 inward. The shaft 28 rests on shoulder 18 (on drive wheel 30) and forces sleeve 17 along shaft 15 and disengages sleeve 17 from the compass card 2 and hence from the gyro. By rotating rod 26 the bevel gears 27 and 29 interact and shaft 28 is rotated, rotating drive wheel 30, which is preferably a resilient material such as rubber, and which is firmly pressed against shoulder 18 causing sleeve 17 to rotate. Pointer 3—3' which is attached to sleeve 17, is rotated to reflect the selected course and the differential resolver 21 is rotated (without the compass card) to change the emitted signal. It should be noted that disengagement of the sleeve 17 from frictional contact with the compass card 2, does not disengage gears 19 and 20. The sleeve 17 and hence pointer 3—3' and the differential resolver 21 are always engaged.

The two phase signal 38 emitted from differential resolver 21 is compared with the received two phase radio navigational signal 39. This aspect of the present instrument can be better understood by reference to FIG. 5.

FIG. 5 shows a block diagram of a preferred embodiment of the radio navigation portion of the apparatus.

The course selection for radio navigation is made by depressing the course selector knob (FIGS. 1 and 2) which, as described elsewhere, disengages the course selection pointer from the compass card and allows a selection of any course on 360°. Release of the course selector knob causes the pointer to be engaged with the compass card and to rotate therewith.

FIG. 5 illustrates how the deviation from the selected radio navigation course may be implemented in the display as shown in FIG. 1.

The navigation radio 161 (such as NARCO'S NAV-124) receives a 2 phase navigational signal from a ground station. The navigational radio also emits a single phase reference signal at 30 Hz. For the present embodiment, this signal is passed through an attenuator 162 and an amplifier 163 into phase shifter 164. The phase relationship between the control transformer 165 and differential resolver 167 makes it necessary to shift the phase 67°. The output from the phase shifter drives the control transformer 165. The differential resolver 167 is releasably engaged to the compass card through a clutch 173, and continuously engaged through a gear system to the course selector 166. The course selector has a pointer 171 which is associated with the compass card. The clutch 173 allows the course selector and the differential resolver to disengage from the compass card 160 while the compass is still connected to gyro 172, i.e., without caging the gyro.

When the course selector is disengaged from compass card, any course can be selected, then the course selector 166 and differential resolver 167 are reengaged with the compass card by allowing the clutch to engage and are movable therewith. When a new course is selected the differential resolver simultaneously changes as a result of being geared to the course selector and the 2 phase signal is varied to indicate the new position of the pointer, 171, i.e., the selected course. The 3 phase signal from the control transformer is transmitted through amplifier 168 to differential resolver 167, which rotates in the opposite direction from control transformer 165. The signal which the differential resolver puts out is 180° out of phase with that of the control transformer and since they rotate simultaneously, in different directions, with the compass card as the gyro drives it, any change in signal from the control transformer (compass position signal) as a result of a change in the horizontal position of the craft as reflected by the gyro driven compass card, is cancelled out and the 2 phase signal output showing the course selected (position of the course selection pointer) from the differential resolver 167 back to the navigational radio 161 remains constant for comparison with the incoming 2 phase navigational signal.

The comparison of the two signals, i.e., the selected course and the received navigation signal, is conventionally carried out and the resultant information transmitted to galvanometer 169 where the deviation indicator 170 either remains on a vertical line through the compass dial, if the craft is on the selected course, or if it is not, the indicator is deflected right or left. To correct the course the craft is flown toward the deviation indicator to bring it back to the vertical position, i.e., on course indication. As the direction of the craft goes toward the deviation indicator the gyro drives the compass card and hence the control transformer and the differential resolver, such that when the 2 phase signal from the differential resolver again corresponds to the selected course, the comparison in radio 161 will not generate a current to move the galvanometer from the vertical position.

The entire display instrument is illustrated in side elevation in FIG. 3. All of the instrument components are mounted in housing 40 which is provided with vacuum connection 41 and filter air supply connection 42. Electrical connections 43 and 44 provide power and the signals noted above in conjunction with circuit board 45.

The gyro 46, a standard vacuum driven gryo, is connected through drive gear 47 to main instrument drive gear 48. Only the rotatable compass card 50 is directly attached to the main instrument drive gear 48 through shaft 49 by screw 53. The shaft 49 passes through bushing 51 and is positioned to prevent lateral movement of the shaft and drive gear 48 by back bushing 52. Gear 54 is mounted onto shaft 49, and by slip clutch 90 to main instrument drive 48 and rotates the rotor (not shown) of control transformer 55 through gear 56, which is mounted to the rotor extension 57. Thus when the gyro rotates the control transformer 55 reflects the change and the three phase signal is varied. The manner in which the differential transformer 58 (i.e., the rotor) is associated with the gyro and compass card has been described above more specifically. The rotor (not shown) of differential transformer 58 is connected via the rotor extension 59 and hence by gear 60 mounted thereon to gear 61 which is mounted to sleeve 62. The sleeve 62 is mounted annularly about shaft 49 which is the main drive from the gyro, hence the sleeve 62 and the course selector 64—64' in normal operation are coupled to the gyro by a clutch arrangement when sleeve 62 is in biased contact with compass card 50.

The sleeve 62 abuts the back of the compass card 50 and engaged by friction (the assembly of gear 61 and sleeve 62 being biased toward said compass card by spring 65). FIG. 6 shows an isolated detail of the manner of the friction engagement of sleeve 62 to compass card 50. Preferably a resilient member 63 to serve as a friction pad is affixed to one or both adjacent and contiguous surfaces of the compass card or sleeve 62. The course selection pointer 64—64' is attached to sleeve 62 and extends along the central axis of the sleeve, then wraps over the edge of compass card 50 to provide a marker of the course selected. The portion 64 of the pointer represents the direction in which the aircraft is heading.

When the sleeve 62 is biased against the compass card 50 and frictionally engaged therewith, the differential transformer 58 is thereby connected to the gyro. Thus, under normal conditions, the gyro movement (which indicates the azimuth of the aircraft) causes the compass card and the course selection pointer to move together.

When the operator desires to adjust solely the compass card, compass knob 65 is depressed (toward the instrument) which moves rod 66 forcing pivotally (pivot 63) mounted arm 67 rearward to actuate the conventional caging mechanism 69 thereby erecting and caging the gyro.

The gyro and caging mechanism are those of 210 Series Directional Gyro (vacuum operated) produced by Aviation Instrument Manufacturing Corporation of Houston, Tex. The conventional caging mechanism operates when arm 67 is pushed by operation of knob 65. Briefly, arm 67 drives an arm 87 with a cam surface 88 thereon under a portion of a tab 89 connected to caging mechanism 69, which pivots about pin 75, forcing the mechanism upward, bringing a friction ring 76 in contact with the lower side of drive gear 47 and bringing the member 78 into contact with eccentric cam 77, thereby preventing rotation of the gimbal assembly 79 and of the rotor housing 80 in the gimbal assembly, i.e., erecting and caging the gyro.

Gear 70 engages gear 54 which is attached to the main instrument drive gear 48 through slip clutch 90. The caging of the gyro also cages the main instrument drive 48. The clutch 90 allows the gear 54 to rotate. Turning knob 65 turns gear 71 and hence gears 70 and 54 thereby rotating the compass card and pointer together. The spring 72 draws the assembly of arm 67, and gears 70 and 71 back to the position shown in FIGS. 3 and 4 when rod 66 is released. The gear 70 is free to rotate on shaft 74 and merely transmits the rotation from knob 65 to the main instrument gear. Extension 73 from arm 67 holds gear 70 on the shaft, but allows it to slide along the shaft 74 until it is engaged with gear 54.

In addition to principal components of the present instrument, there are located on the display panel, adjacent to the compass card, electrically operated To-From lights 81, electrically operated Nav flag 82, electrically operated glide slope flag 83, electrically operated course deviation indicator 84, operated by galvanometer 92 and glide slope deviation indicator 85 operated by galvanometer 91.

As described above, the course selection pointer 64—64' and the differential transformer 58 can be disengaged from the gyro and any desired course selected. This is done by depressing knob 86 which as described before forces sleeve 62 away from compass card 50 and the friction pad 63 (FIG. 7) allowing the pointer 64—64' and hence the differential transformer 58 to be reset free of the compass card and gyro. The gyro is not caged and is fully functional during the selection of the course. When knob 86 is released the sleeve returns (biased by a spring FIG. 2) to contact the friction pad 63 and engage with the compass card and gyro as shown in FIG. 6.

The invention claimed is:

1. An aircraft indicator apparatus for providing heading and course information integrated in one instrument comprising:
   (a) a gyro for providing heading information,
   (b) a compass card,
   (c) a direct drive means connecting said gyro and said compass card,
   (d) compass setting means for independently setting said compass card and erecting and caging said gyro,
   (e) course selector means clutch coupled to said compass card for adjusting the desired course without caging said gyro, independently of said compass card and gyro.

2. The apparatus according to claim 1 having means to disengage said clutch from said compass card.

3. The apparatus according to claim 2 having a course deviation indicator positioned forward of and adjacent to said compass card for showing left or right deviation from the selected course.

4. An aircraft indicator apparatus for providing heading and course information integrated in one panel display comprising:
   (a) a housing for containing said apparatus,
   (b) a gyro, positioned in said housing, for providing heading information,
   (c) a compass card positioned within said housing,
   (d) direct drive means, for direct driving of said compass card from said gyro,
   (e) instrument face means for displaying heading and course information,
   (f) compass setting means, for adjusting said compass card independently of said gyro when said gyro is caged,
   (g) course selector means clutch coupled to said compass card for adjusting the desired course indicated on said instrument face by a course selector pointer, independently of said compass card and said gyro, without caging of said gyro, said course selector pointer being adapted to normally move together with said compass card in response to said gyro, and (h) means to cage said gyro operably connected with said compass setting means.

5. The apparatus according to claim 4 wherein said instrument face means comprises indicia of compass direction on said compass card, a course selector pointer and a course deviation indicator.

6. The apparatus according to claim 5 wherein said instrument face means additionally comprises a To-From indicator.

7. The apparatus according to claim 6 wherein said instrument face means additionally comprises a radio navigation flag and glide slope flag.

8. The apparatus according to claim 4 wherein said course deviation indicator is mounted in said housing free of said compass card.

9. The apparatus according to claim 8 wherein said course deviation indicator is mounted above or below said compass card.

10. The apparatus according to claim 9 wherein said course deviation indicator comprises a movable needle positioned forward of said compass card and extending over a portion of said compass card and positioned on a vertical line through the central axis of said compass card when there is no deviation from the selected course.

11. The apparatus according to claim 10 wherein a glide slope indicator is mounted in said housing 90° away from said course deviation indicator, to indicate deviation from a desired glide slope.

12. The apparatus according to claim 11 wherein said glide slope indicator comprises a movable needle positioned forward of said compass card and extending over a portion of said compass card and positioned on a horizontal line through the central axis of said compass card when there is no deviation from the desired glide slope.

13. The apparatus according to claim 4 wherein said means to cage said gyro comprises a member, which is operatively connected to said compass setting means, having a cam surface for engaging a portion said a hinged caging member for erecting and caging said gyro.

14. The apparatus according to claim 13 wherein said caging member comprises a friction ring for contacting a drive gear of said gyro and a member for contacting an eccentric cam on said gyro.

15. The apparatus according to claim 4 having a transparent cover positioned forward and adjacent to said instrument face means.

16. An aircraft indicator apparatus for providing heading and course information integrated in one panel display comprising:

(a) a housing,
(b) a gyro positioned in said housing, for providing heading information,
(c) a compass card positioned in said housing forward of said gyro,
(d) direct drive means for driving said compass card from said gyro,
(e) compass setting means for independently setting said compass card and erecting and caging said gyro,
(f) a course selected means clutch coupled to said compass to normally move together therewith,
(g) means to disengage said course selector means from said compass card for independently selecting a desired course indicated by a course selector pointer, free of said compass card and said gyro, without caging said gyro, (h) a course deviation indicator comprising an electrically actuated galvanometer, positioned in said housing on a central vertical central axis of said compass card, and a needle movable by said galvanometer, said needle being positioned forward and adjacent to said compass card and extending over a portion thereof.

17. The apparatus according to claim 16 having a glide slope indicator comprising an electrically actuated galvanometer, positioned in said housing 90° away from said course deviation indicator on a horizontal central axis of said compass card, and a needle movable by said galvanometer, said needle being positioned forward and adjacent to said compass card and extending over a portion thereof.

18. The apparatus according to claim 16 wherein said direct drive means comprises a shaft geared to said gyro, said compass card being attached to one end thereof.

19. The apparatus according to claim 18 wherein said course selector means comprises an annular sleeve movably mounted on said shaft and biased toward said compass card.

20. An aircraft indicator apparatus for providing heading and course information integrated in one panel display comprising:

(a) a housing,
(b) a gyro mounted in said housing, said gyro being mounted on a drive gear,
(c) a main instrument drive gear mounted in said housing and engaged with said drive gear,
(d) a slip clutch axially attached to said main instrument drive gear,
(e) a shaft axially attached to said slip clutch, and extending forward from said main instrument drive gear,
(f) a compass card mounted to said shaft,
(g) an annular sleeve mounted on said shaft and biased against said compass card, whereby said sleeve normally moves with said compass card,
(h) a course selector pointer attached to said annular sleeve and extending forward of said compass card,
(i) course selector means for disengaging said annular sleeve from contact with said compass card to allow independent course selection, free from said compass card and said gyro,
(j) course deviation means positioned forward of and adjacent to said compass card on a vertical central axis thereof, and
(k) compass setting means for erecting and caging said gyro for independently adjusting said compass card.

21. The apparatus according to claim 20 wherein a control transformer connected to a source for receiving a reference radio signal is geared to said main instrument drive gear and a differential resolver for receiving a signal from said control transformer and transmitting a signal to a radio for comparison with a received navigation signal is geared to said course selector means, said control transformer and said differential resolver being electrically connected.

22. The apparatus according to claim 21 wherein said course deviation means comprises (a) a galvanometer electrically connected to said navigation radio for receiving a signal therefrom to indicate deviation of a course from the selected course and (b) a needle positioned forward of and extending laterally over a portion of said compass card and movable by said galvanometer to indicate right or left deviation of said course from the selected course.

* * * * *